Figure 15:
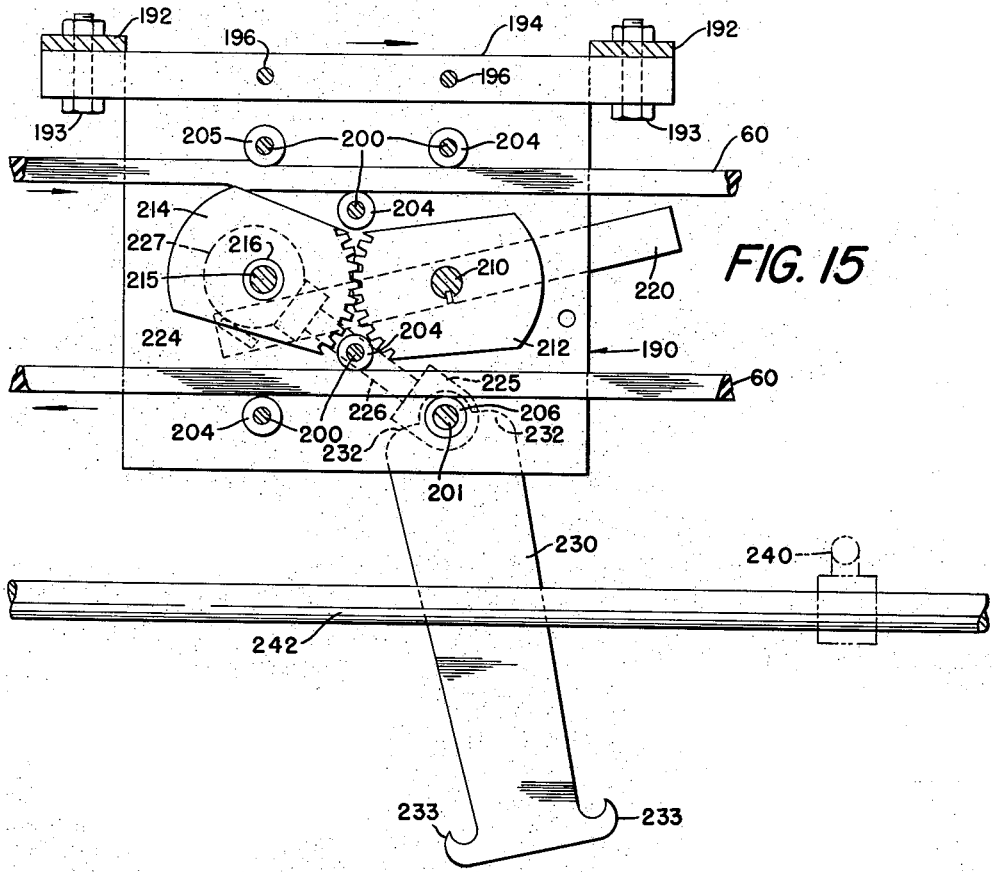

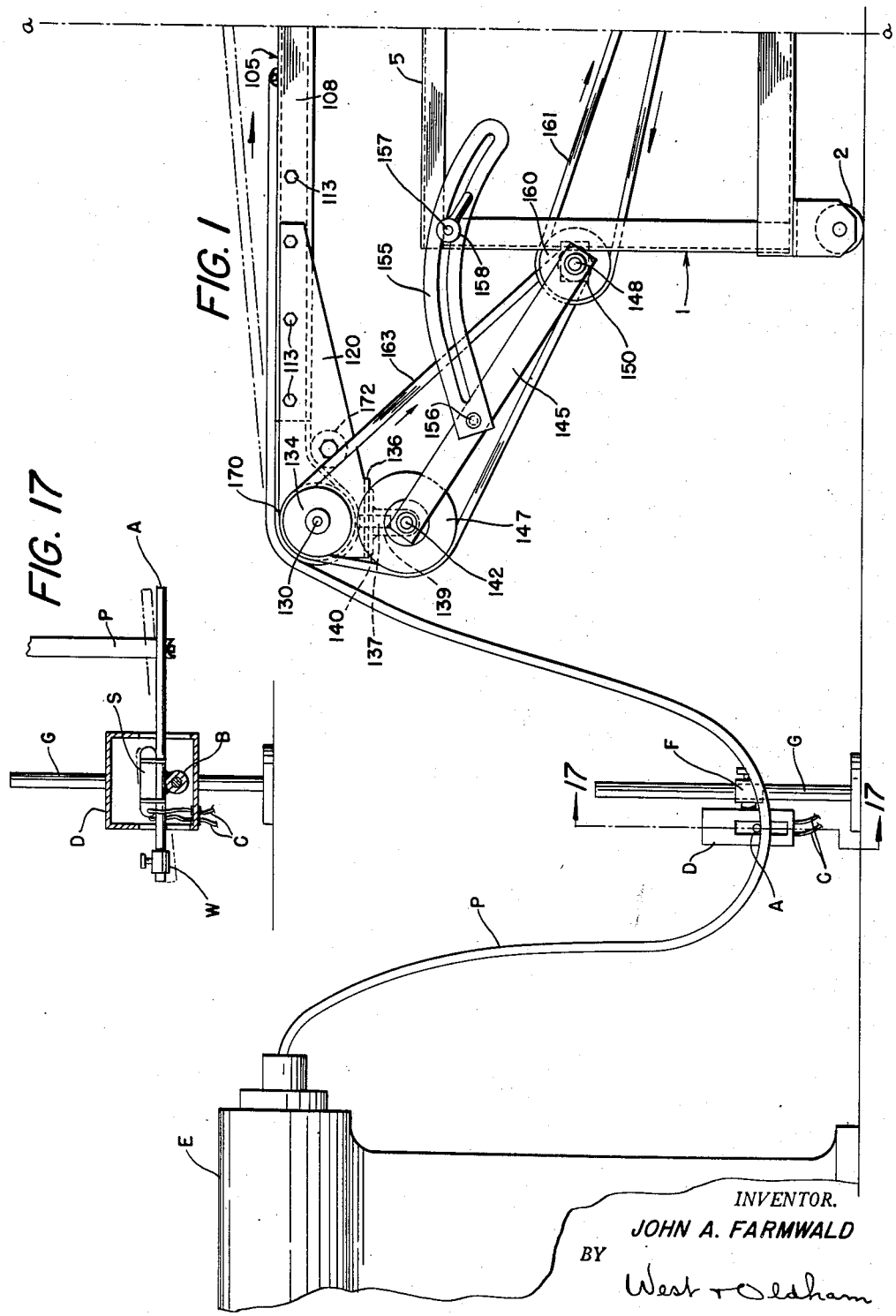

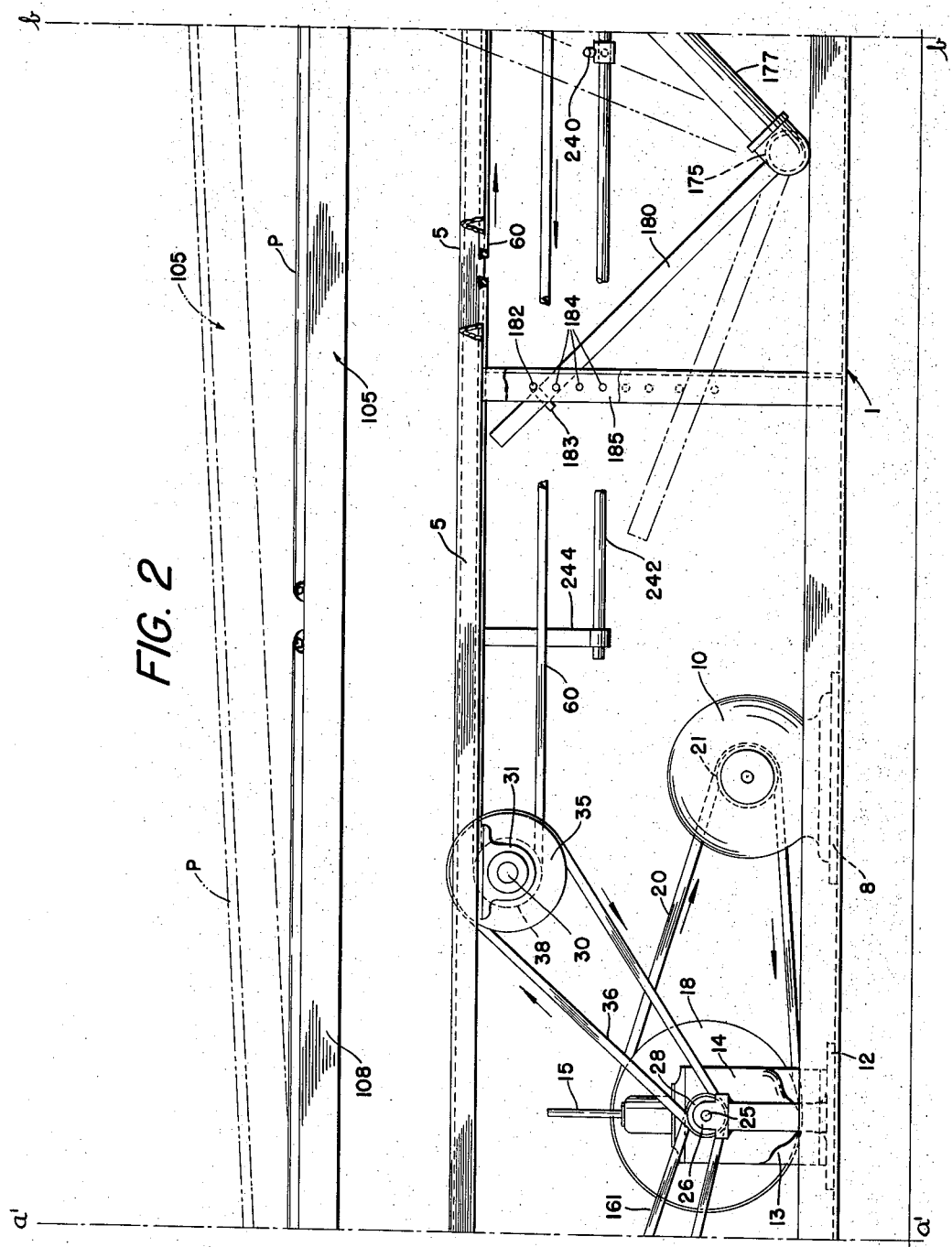

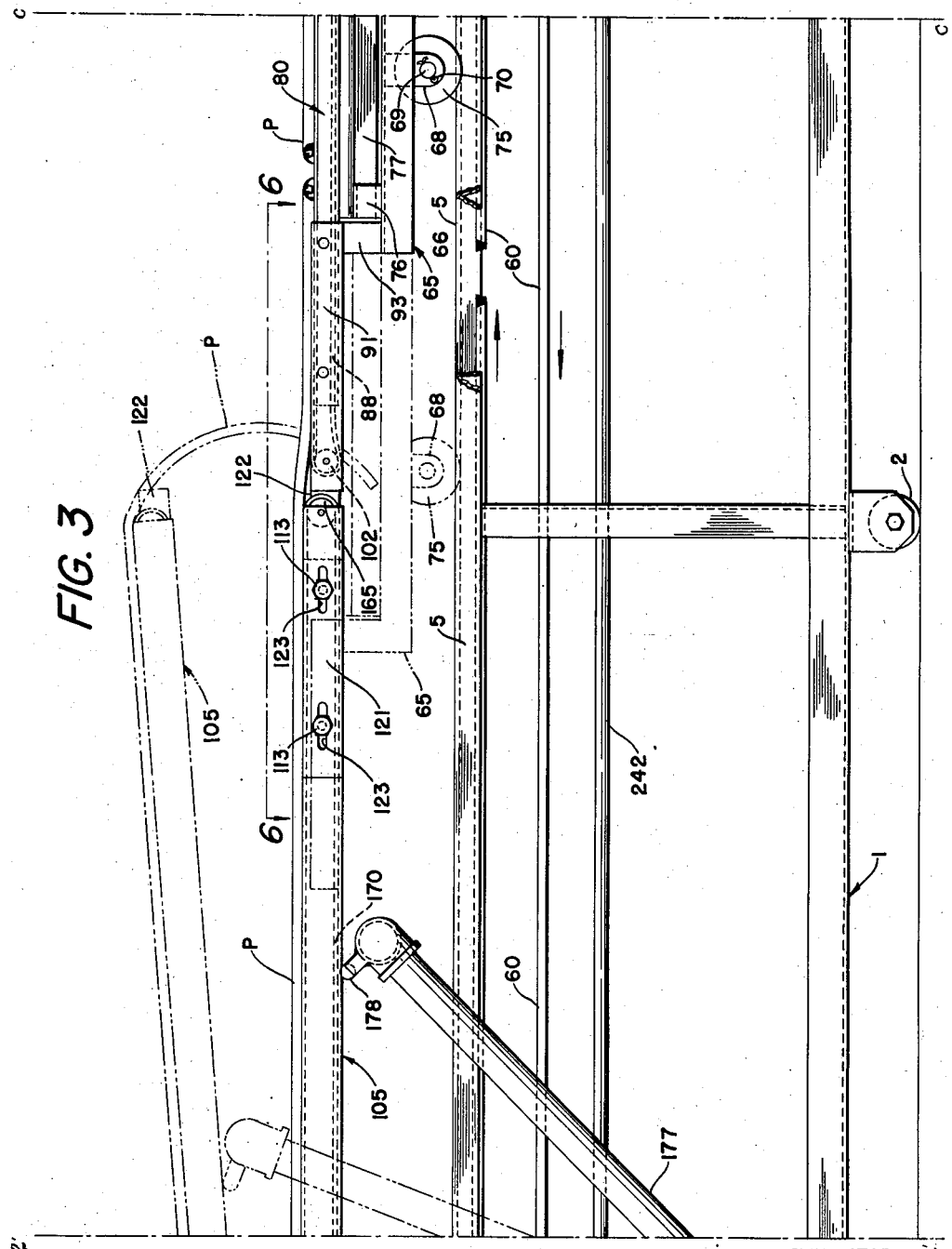

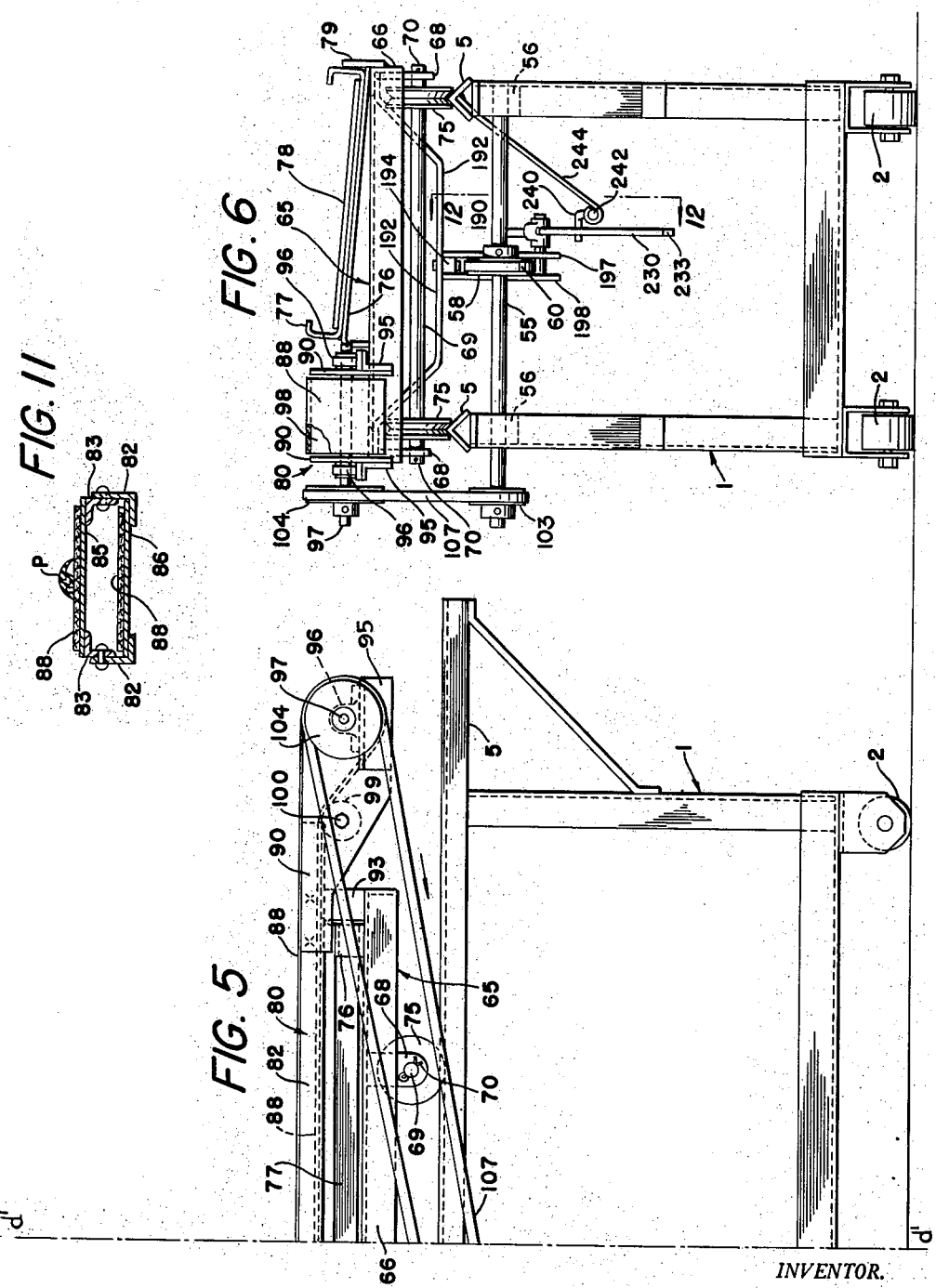

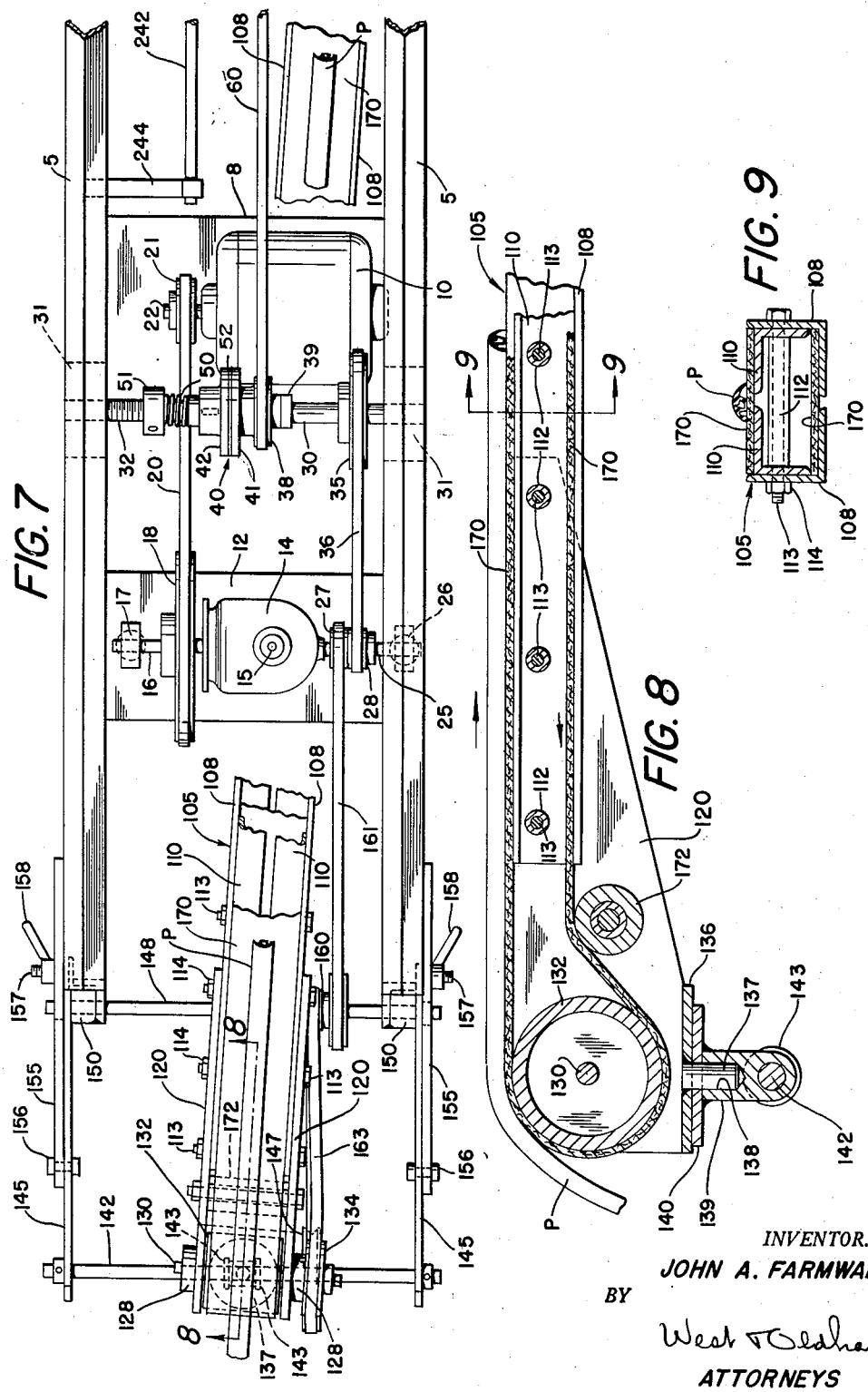

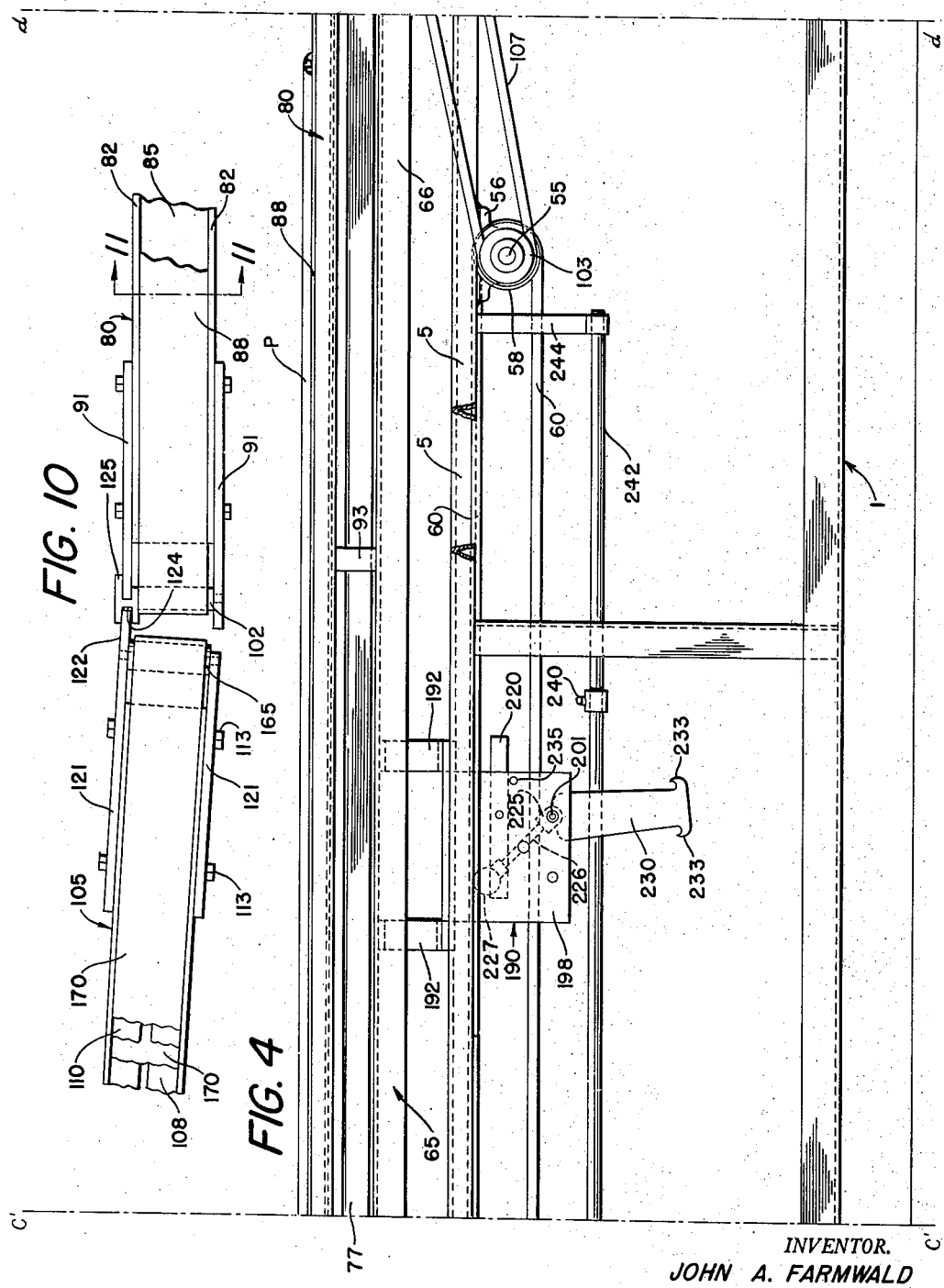

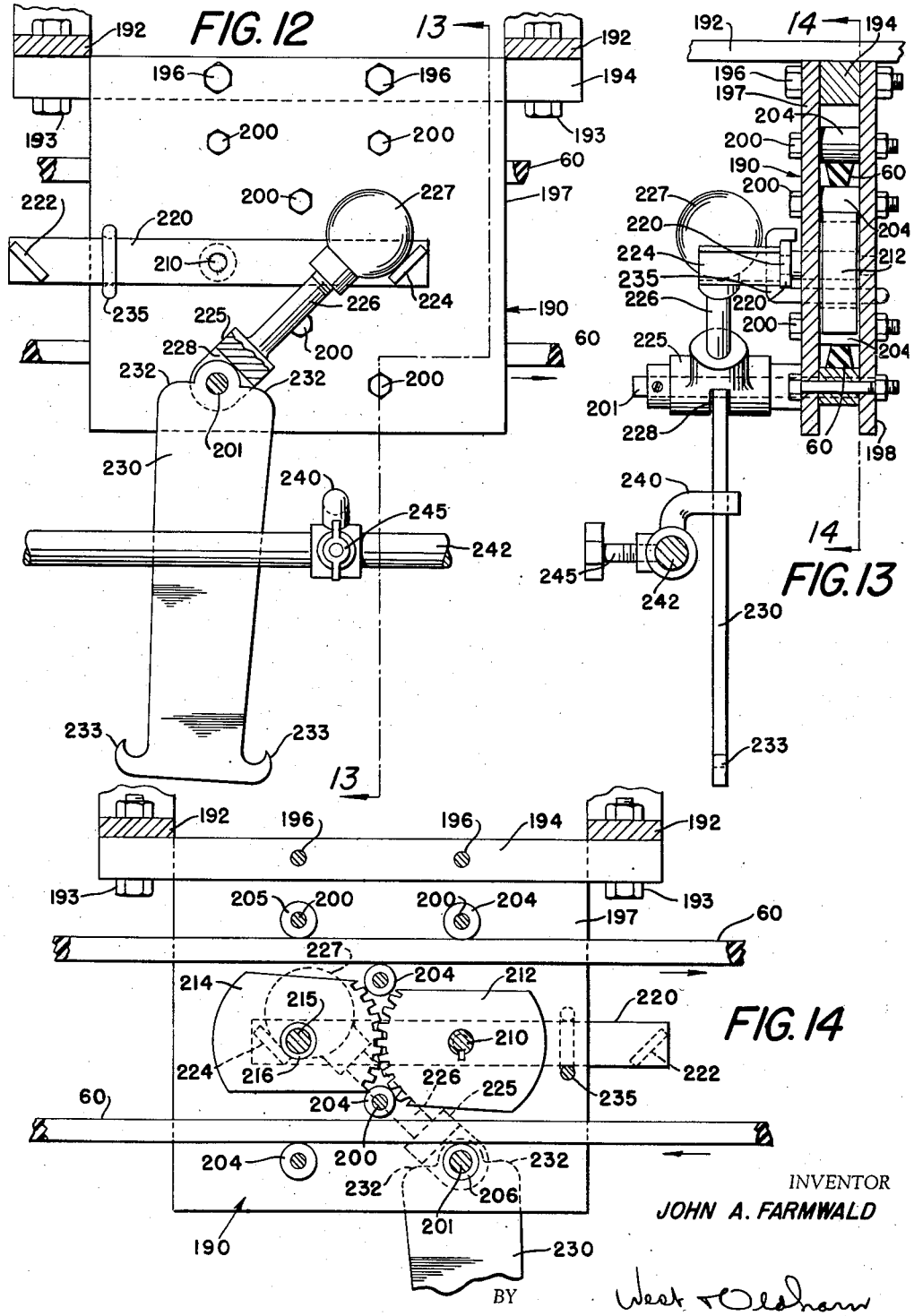

June 1, 1954

J. A. FARMWALD 2,679,964

RECEIVING APPARATUS FOR PRODUCTS
OF EXTRUDING OR SIMILAR MACHINES

Filed June 30, 1950

8 Sheets-Sheet 8

INVENTOR
JOHN A. FARMWALD

BY West Oldham

ATTORNEYS

Patented June 1, 1954

2,679,964

UNITED STATES PATENT OFFICE 2,679,964

RECEIVING APPARATUS FOR PRODUCTS OF EXTRUDING OR SIMILAR MACHINES

John A. Farmwald, Middlefield, Ohio, assignor to The Johnson Rubber Company, Middlefield, Ohio, a corporation of Ohio Application June 30, 1950, Serial No. 171,289

18 Claims. (Cl. 226—19)

The present invention resides in an apparatus for receiving the products of machines from which the material is discharged in the form of continuous, elongated or linear pieces having definite cross sectional shapes.

The invention is intended for use particularly with machines that produce extrusions of synthetic or natural rubber or other plastic materials, and which may be of many different cross sectional sizes and shapes. The shapes may vary from one of extreme simplicity to a very complex design, and the extrusion may be of any cross sectional size within the capacity of such machines, and either solid or hollow.

Examples of articles made from the continuous extruded products of machines of the above mentioned class are refrigerator door gaskets, vehicle windshield mounting strips or gaskets, sealing or cushioning strips for use otherwise on vehicles, links and nosings of fabricated floor mats of rubber or the like, tubes—whether cylindrical or of other shapes, smooth, fluted or otherwise—and solid pieces of similar external appearance. It is evident from this variety of articles that the cross sectional sizes and shapes of the products of machines of the aforesaid class differ greatly, and that some products of the smaller and simpler cross sections may be readily folded back and forth about relatively small radii into substantially parallel sections without detrimental effect, while others of greater cross sectional area and of more intricate shapes would not permit of such treatment.

An object of the invention is to provide an apparatus for receiving the products of extruding or similar machines which, by suitable adjustments, may be made to do either of two things, namely: automatically deposit the product on a receptacle or tray in reverse folds of predetermined length, or deliver the products in such manner as to facilitate their being severed into pieces of desired length and the pieces being placed side by side upon such receptacle or tray. Detached trays are usually employed as receptacles for the material because they can be conveniently removed from the apparatus and readily transported to and from the curing ovens with the material thereon. The first of the above mentioned modes of operation applies only to extrusions of the simpler and smaller cross sections; the second to those of the larger and more intricate shapes.

Another object is to provide apparatus of the foregoing nature that may be easily and quickly changed from one mode of operation to the other.

Further objects are to provide relatively simple and efficient reversing mechanism for the carriage of the receptacle or tray; to provide such mechanism that is convenient of adjustment to vary the length of travel of said carriage, and to provide reversing mechanism that incorporates a clutch device and trip means therefor that are uncomplex, effective and reliable.

Other and more general objects of the invention are to provide apparatus for receiving the products of extruding machines or the like that is mobile and capable of being easily and quickly arranged in receiving relation to such a machine; that is relatively simple of construction, and is substantial and durable.

The objects and advantages above enumerated, with others that will appear as this description proceeds, are attained in the embodiment of the invention illustrated in the accompanying drawings wherein like parts are designated by like reference characters throughout the several views, and in which—

Figure 16:
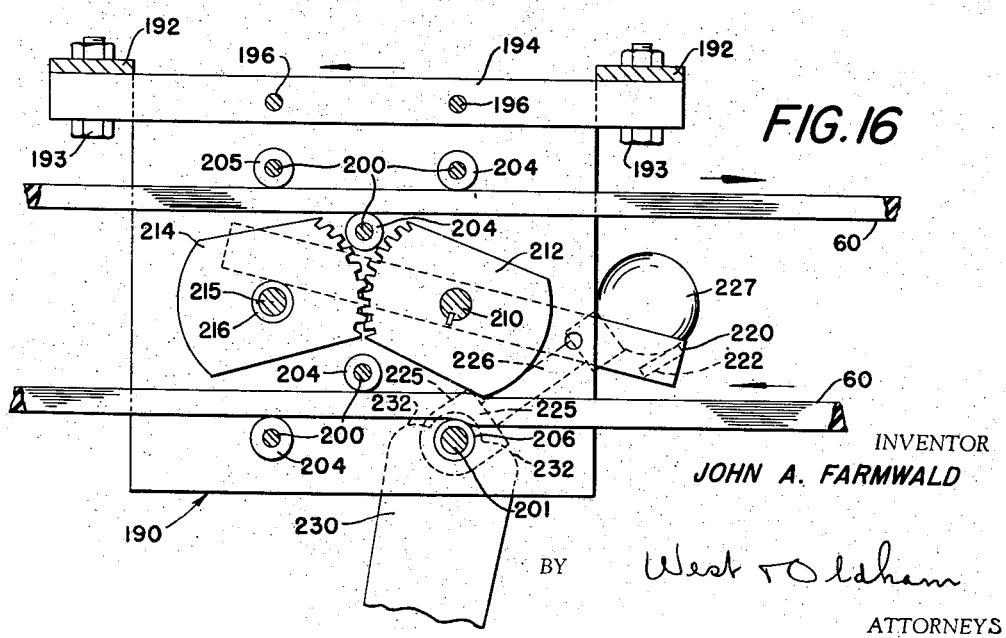

Figs. 1, 2, 3, 4 and 5, collectively, represent what may be regarded, for descriptive purposes, as a rear elevation of a receiving apparatus constructed in accordance with the invention, the successive views registering on the broken lines $a$—$a'$, $b$—$b'$, etc., Fig. 1 including the discharge end of an extruding machine, and a control switch for the motor of the apparatus by which the speed of the motor, and consequently that of the apparatus, is made to correspond approximately with that of the extrusion; Fig. 6 is an end elevational view of the apparatus as observed from the right of Fig. 5; Fig. 7 is a fragmentary plan view of the apparatus and embraces the end of the machine shown in Fig. 1 and a part of the adjacent portion shown in Fig. 2; Fig. 8 is a section on the line 8—8 of Fig. 7, drawn to a scale twice that of the previous view; Fig. 9 is a transverse section on the line 9—9 of Fig. 8; Fig. 10 is a plan view of the adjacent ends of the two conveyors incorporated in the machine, showing them arranged for conjoint use; Fig. 11 is a section on the line 11—11 of Fig. 10; Fig. 12 is a detail that shows, in front elevation and in neutral position, the clutch device and trip means incorporated in the reversing mechanism of the carriage; Fig. 13 is a section on the line 13—13 of Fig. 12; Fig. 14 is a section taken on the line 14—14 of Fig. 13, looking in the opposite direction from that of Fig. 12; Fig. 15 is a view, similar to Fig. 14, showing the clutch device gripping the top flight of the carriage propelling belt, and the trip means in corresponding position; Fig. 16 is a view, similar to Fig. 15, showing the clutch device and trip means in reverse position, and Fig. 17 (Sheet 1) is a section on the line 17—17 of Fig. 1.

The frame of the apparatus, designated generally by the reference numeral 1, is elongated and of rectangular formation and, in the present instance, is constructed of pieces of angle iron suitably connected together, as by welding. The frame is supported a distance above the floor by rollers 2. The top of each side member of the frame 1 is constituted of a rail 5 of inverted V-shape in cross section. These rails form a track for a carriage, later to be described. A platform 8 (Figs. 2 and 7) is supported by and between the lower portions of the side members of the frame 1, near the left hand end of the apparatus as viewed from the rear (as in Figs. 1 to 5) and this platform mounts an electric motor 10. Similarly supported by the frame is a second platform 12 that is located between the former platform and the adjacent end of the apparatus. The platform 12 supports, through a standard 13, a conventional transmission 14, such as that used in automotive vehicles, the gear shift lever being designated 15. A drive shaft 16 extends from one end of the casing of the transmission 14 and is journaled at its outer end in a pillow block 17, and secured to said shaft is a relatively large pulley 18 that is driven, through a belt 20, by a smaller pulley 21 on the shaft 22 of the motor 10. Extending from the opposite end of the transmission casing is a driving shaft 25 that is journaled at its outer end in a pillow block 26. Secured to said driving shaft are pulleys 27 and 28.

Referring to Figs. 2 and 7, 30 denotes a shaft that is journaled at its ends in hangers 31 that are secured to and depend from the undersides of the rails 5, said shaft having a threaded portion 32 adjacent the front of the machine. A pulley 35 is secured to the shaft 30 in the vertical plane of the previously mentioned pulley 28 and an endless belt 36 extends about these pulleys and provides driving connection between the shaft 25 of the transmission 14 and the shaft 30. Mounted upon the shaft 30 about midway of its length, and capable of rotation with respect thereto, is a pulley 38. This pulley is held against rearward movement on the shaft by a collar 39. Fixed to the pulley 38, as by being formed integral therewith, and on the side of the pulley opposite the collar 39, is one member of a friction clutch, designated generally by the numeral 40. The member of the clutch that is in fixed relation to the pulley 38 is designated 41, and the other member 42 is splined to the shaft 30, or otherwise has driving connection therewith while being capable of some movement longitudinally of the shaft. The member 42 is urged toward the member 41 by a spring 50 that surrounds the shaft 30 and is compressed between the hub of the member 42 and a nut 51 that is mounted for adjustment on the threaded portion 32 of the shaft thereby providing adjustment for the tension of the spring 50. 52 denotes friction material between the members 41 and 42.

Referring to Figs. 4 and 6, a shaft 55 is journaled in hangers 56 that depend from the top rails of the side members of the frame 1, and secured to said shaft, approximately midway between the side members of the frame, is a pulley 58. Engaged about this and the previously mentioned pulley 38 is a carriage propelling belt 60.

The previously mentioned carriage that traverses the track composed of the rails 5, and which I now designate generally by the reference numeral 65, includes a rectangular frame 66, desirably constructed of angle iron. Adjacent the opposite ends of the carriage, brackets 68 are secured to and depend from the sides of the frame and have apertures through which the ends of axles 69 project and beyond which said axles are provided with cotter pins or the like, designated 70. Grooved rollers 75 on the axles 69 traverse the rails 5. Incorporated in the frame 66, and extending transversely thereof, are supports 76 for a tray 77. The tops of the supports are desirably inclined downwardly toward the front of the machine, thereby to dispose the tray in more convenient relation to an operator standing in front of the machine, and so as to facilitate placement of the material upon the tray. A plate or pallet 78 may be placed upon the bottom of the tray to receive the material; and lugs 79, that are secured to and rise from the front of the carriage frame, prevent the tray from sliding forwardly.

The carriage 65 also incorporates a conveyor, designated generally by the reference numeral 80. This conveyor extends along the carriage, rearwardly of and parallel with the tray. The body structure of the conveyor, as best disclosed in Fig. 11, is, in the present instance, built up of opposed angle bars 82, to the vertical flanges of which are riveted the like flanges of angle bars 83; and supported by the horizontal flanges of said bars are plates 85 and 86 that support the respective upper and lower flights of an endless conveyor belt 88. Secured to and extending beyond one end of this box-like body structure are opposed side plates 90 (Figs. 5 and 6), and similarly related to the opposite end of said structure are opposed side plates 91 (Figs. 3 and 10). This structure is supported from the carriage frame 66, adjacent the ends and transverse center of the latter, by members 93. The outer ends of the side plates 90 are relatively deep and have secured to their outer sides angle members 95 that support pillow blocks 96 in which are journaled the bearing portions of a shaft 97, said shaft extending through apertures in the side plates 90. Secured to the shaft 97, intermediate said plates 90, is a roller 98 about which the conveyor belt 88 is engaged and by which it is driven, as will presently be explained. The top of the roller 98 is in substantially the plane of the upper plate 85 of the previously described body structure. Accordingly the top flight of the belt travels in a straight course from said plate to the pulley, and in order to dispose the bottom flight of the belt in similar relation to the lower plate 86 of said body structure, a guide roller 99 is supported in position to accomplish this end by a shaft 100 that is supported by and between the side plates 90. At the opposite end of the structure, the belt 88 is engaged about an idler roller 102 (Figs. 3 and 10), said roller being suitably supported between the side plates 91 in proper relation to the plates 85 and 86 to receive the belt from the latter and properly direct it to the former.

Fastened to the rear ends of the respective shafts 55 and 97 (Figs. 4, 5 and 6), in the same vertical plane, are pulleys 103 and 104 about which an endless belt 107 is engaged, thereby to transmit power from the shaft 55 to the driving pulley 98 of the conveyor belt 88.

Inasmuch as the apparatus is illustrated in solid lines in the drawings as conditioned to handle extruded material of cross sectional sizes and shapes that make it impractical to fold the material back and forth upon itself, so to speak, or, in other words, to perform the second described mode of operation, I shall now introduce the parts of the machine that cooperate with those already described to deliver the material to the conveyor 80, whereon the material is adapted to be cut to desired length and from which it is transferred to the tray 77.

A second conveyor, designated generally by the reference numeral 105, includes a body structure somewhat similar to that of the conveyor 80. As appears best from Fig. 9, the body structure of the second conveyor is made up of two angle bars 108, whose broad horizontal flanges constitute the bottom of the structure, and two angle irons 110, whose similar horizontal flanges form the top of the structure, the vertical flanges of the latter angle bars being engaged with the inner sides of the corresponding flanges of the angle bars 108. Tubular spacers 112 are disposed between the vertical flanges of the angle bars 110, adjacent each end of the body structure, and bolts 113 are extended through said spacers and through aligned holes in the vertical flanges of the several angle bars and have nuts 114 applied to their threaded ends. The three bolts 113 nearest the left hand end of the body structure of the conveyor 105 (Figs. 7 and 8) serve also to secure side plates 120 to the body structure, and the two bolts adjacent the opposite end of the conveyor (Figs. 3 and 10) serve to clamp side plates 121 to the body structure in any adjusted position with respect thereto, said plates being provided with slots 123 which provide for such adjustment. One of the plates 121 has an extension or tongue 122 that is adapted to be engaged within a groove 124 of a member 125 that is carried by the adjacent side plate 91 of the conveyor 80. Thus, when the conveyors lie in substantially the same plane, with the tongue 122 in the groove 124, the end of the conveyor 105 is held against lateral movement with respect to the conveyor 80.

The opposed plates 120 of the conveyor 105 are provided adjacent their outer ends with bearings 128 wherein is journaled a shaft 130 to which is secured, intermediate the said plates, a driving roller 132. The shaft extends beyond the bearing of the rear plate 120 where there is fastened to it a pulley 134. A bottom plate 136 is welded or otherwise secured to the lower edges of the plates 120 below the roller 132, and this bottom plate carries a kingpin 137 (Fig. 8) that operates within a recess 138 of a member 139 that mounts a disc 140 on which the plate 136 bears. The member 139 is mounted on a cross bar 142, and is held against movement longitudinally thereof by collars 143. The cross bar 142 is a part of a yoke-like structure that includes side members 145 to the outer ends of which the ends of said cross bar are fastened. Rotatably mounted on the cross bar 142, directly beneath the pulley 134, is a somewhat larger pulley 147. The inner ends of the side members 145 of the aforesaid yoke-like structure are pivotally sustained by a shaft 148 that is supported in blocks 150 carried by the adjacent end of the frame 1 of the apparatus. Arcuate, slotted plates 155 are connected at one of their ends to the side members 145, by pivots 156; and extending from the adjacent top corners of the frame 1, through the slots of said plates, are threaded studs 157 whereon clamping nuts 158 are screwed. Obviously, by this means, the yoke-like structure may be held in various positions of adjustment about the center defined by the shaft 148.

Mounted on the shaft 148 is a double pulley 160, about the larger part of which is extended a belt 161 that is also engaged about the previously mentioned pulley 27 on the driving shaft 25 of the transmission 14. The smaller part of the double pulley 160 receives a belt 163 that embraces the pulleys 134 and 147.

Rotatably supported by and between the outer ends of the side plates 121 (Figs. 3 and 10) of the conveyor 105 is a guide roller 165 about which, and the previously mentioned driving roller 134, is engaged an endless conveyor belt 170. The top flight of this belt rides upon the horizontal flanges of the angle bars 110 of the body structure of the conveyor (see Fig. 9), while the bottom flight of said belt rides upon the horizontal flanges of the angle bars 108, the lower flight of the belt being received from the latter flanges by a guide roller 172 that is rotatably supported by and between the side plates 120 adjacent the driving roller 132.

The apparatus, as so far described, is adequate to handle material according to the second mode of operation. It may be explained, however, that regardless of which of the two modes of operation is to be carried out, in preparation therefor the apparatus is placed in front of the machine whose products are to be handled, in spaced relation thereto, as illustrated in Fig. 1. Here the apparatus is shown in position to receive the material or product, designated P, of an extruding machine E. The material is permitted to sag between the machine and apparatus, and disposed within the loop thus formed is the actuator or rocker arm A of an electric switch S, desirably of the mercury type, and wherein contact is made between the terminals of conductors C when the actuator or arm is lifted by the material P. While the switch, and the electrical system incorporating it, constitute no part of the present invention, it may be explained, briefly, that the actuator or arm on which the capsule of the mercury switch is mounted, is pivoted at B within a casing D that may be secured in any adjusted position, by a clamp F, along a pedestal G. The sides of the casing D are slotted to accommodate the actuator or arm A, and the latter is shown as counterbalanced by an adjustable weight W.

The speed of extrusion is determined somewhat by the size and character of the product. The speed of the receiving apparatus may be roughly set to correspond thereto by the transmission 14. Since it is essential, however, that the speed of the conveyor belts of the apparatus be approximately synchronized with that of the material P as it is delivered from the machine, provisions are made for regulating the speed of the motor 10 and, as will be readily understood by those skilled in the art, this may be accomplished by including a rheostat in the motor circuit. Therefore, in starting the apparatus, the necessary adjustments are made to accomplish this approximate synchronization. Obviously, it is impractical to attempt to obtain absolute uniformity in the movements of the material and conveyors, but in regulating the speed of the motor in the manner above described, something in excess of the speed required is favored. Otherwise the material might contact the floor between the machine and apparatus.

The switch S is incorporated in the motor control circuit in such fashion as to reduce the speed of the motor when the switch is closed.

Consequently, when the speed of the apparatus exceeds, to an appreciable degree, that of the material, the latter will lift the actuator or arm A and close the switch S thereby to slow down the speed of the motor 10. This slowing down of the motor may be only momentary, as it will cease when the loop of material drops enough to permit the arm or actuator A to return to its former position and open the switch.

Two persons attend the apparatus in the operation at present under consideration, and they stand in front of the structure, one near each end of the tray 77. As the material P is delivered by the conveyor 105 to the conveyor 80, its advancing end is permitted to approach a position near the far end of the tray. The operator near the other end of the tray then severs a piece of the desired length from the material and the two attendants lift said piece from the conveyor 80 and place it upon the tray. This performance continues until the bottom of the tray is practically covered, whereupon the tray with the material thereon is transported to a curing oven.

In carrying out the other, or first mentioned mode of operation, in which the material is laid in alternate folds upon the tray directly from the conveyor 105, it is necessary that the said conveyor be adjusted to approximately the position shown in broken lines in Figs. 1, 2 and 3, that is to say, with its delivery end elevated; and that the carriage 65, with the tray 77 thereon, be reciprocated along the frame of the apparatus a distance equal to the length of material between successive folds.

The means for lifting the delivery end of the conveyor 105 includes a shaft 175 (Fig. 2) that is supported for oscillation by suitable bearings, transversely of the bottom of the frame 1 of the apparatus. Secured to the rear end of this shaft is an arm 177 which, at its upper end (Fig. 3) carries a cross bar 178 that extends forwardly beneath the conveyor 105 and is of a length sufficient to sustain the conveyor throughout the range of lateral movement of the conveyor when swung about the axis of the kingpin 137. A lever 180 (Fig. 2) is fastened to the front end of the shaft 175, and by means of this lever the shaft may be rocked to raise and lower the conveyor 105, and said conveyor may be held at the desired elevation by engaging a pin 182, whose outer end 183 overhangs said lever, in the appropriate one of a series of holes 184 in an upright 185 of the apparatus frame. The height at which the delivery end of the conveyor 105 is to be held, depends upon the flexibility and other characteristics of the material or product P; and the desired angle of inclination of said conveyor is had by vertically adjusting the receiving end of the latter. Said receiving end is held in any position of adjustment by means already described, including the arcuate plates 155, studs 157, and clamping nuts 158. Lifting of the delivery end of the conveyor 105 disengages the extension or tongue 122 thereof from the grooved member 125 of the conveyor 80 so that the conveyor 105 is now permitted to swing back and forth about the axis of the kingpin 137. This disengagement of the tongue 122 from the member 125, and removal of the belt 107 from one or both of the pulleys 103, 104, releases the carriage 65.

I have already referred, by the numeral 60, to the carriage propelling belt. This belt travels in the direction indicated by the arrows in Figs. 2 and 3, and in order to reciprocate the carriage it is only necessary to alternately couple it to the top and bottom flights of said belt. This is accomplished by reversing mechanism which I shall now describe. In Figs. 4, 6 and 12 to 16, said reversing mechanism is designated, generally, by the reference numeral 190; and it is supported from the carriage by cross members 192 that are connected at their ends to the side members of the carriage frame 66. Connected at its ends to the cross members 192 by screws 193, in the vertical plane of the carriage propelling belt 60, is a rectangular bar 194, the same being somewhat wider than the belt 60. Secured to the sides of the bar 194, by bolts 196, are the respective front and rear face plates 197 and 198. A plurality of bolts 200, and a headed pin 201, are extended through aligned apertures in the two face plates, and, by means of said bolts, the face plates are clamped against the ends of tubular spacers that are applied to said bolts intermediate the plates and to all but one of which spacers I have applied the reference numeral 204. The one not so designated I shall refer to as an abutment 205, and a second abutment 206 is constituted of a sleeve that is applied to the pin 201. It will be observed from Figs. 14, 15 and 16, that the upper flight of the belt 60 passes beneath the abutment 205 and between the adjacent spacers 204 to the right thereof, and that the lower flight of the belt bears on the abutment 206 and passes between the two spacers 204 to the left thereof.

Supported for oscillation in bearing apertures in the front and rear face plates is a shaft 210 to which is keyed or otherwise secured, between the face plates, a clutch member 212. The opening of said member that receives the shaft 210 is shown somewhat above the center of the member. A similar clutch member 214 is supported for oscillation by a stub shaft 215 that is carried by and extends between the face plates. The opening of the clutch member 214 is fitted with a bushing 216 and is shown as somewhat below the center of the clutch member. The adjacent edges of the two clutch members are described on arcs from their axes of oscillation and are provided with teeth that mesh, wherefore, any movement of the clutch member 212 will be transmitted to the clutch member 214.

Fastened to the shaft 210 in front of, and in slightly spaced relation to, the face plate 197, is a beam 220 that carries inclined lugs 222 and 224 adjacent its opposite ends. Loosely journaled upon the forward end portion of the previously mentioned pin 201 is the hub 225 of an arm 226 that carries, at its free end, a weight 227. Also journaled upon the forward end portion of the pin 201, within a notch 228 of the hub 225, is an apertured lug of a trip element 230, the same being provided with shoulders 232 on opposite sides of said lug. The free end of the trip element is shown as provided with hooks 233. The tripping mechanism is adapted to be held in neutral position, as shown in Figs. 12 and 14, by a locking pin 235 that is adapted to be inserted through aligned holes in the front and rear face plates 197 and 198, and is appropriately formed at its outer end to embrace the beam 220. The trip element 230 is arranged to engage stops 240 that are adjustable along a rod 242 suspended, by means of hangers 244, from the front rail 5 of the apparatus frame, said stops being secured in adjusted position to the rod 242 by clamping screws 245.

I have already explained how the delivery end of the conveyor 105 is elevated, and how the carriage 65 is released for reciprocation. To further condition the apparatus to perform the second mode of operation, the locking pin 235 is removed, thereby to free the clutch members of the reversing mechanism, and the stops 240 are adjusted along the rod 242 to determine the length of travel of the carriage. With the locking pin 235 removed, the weight 227, bearing against the lug 224 of the beam 220, swings the latter to the position shown in Fig. 15, thereby to rock the clutch members 212 and 214 to the positions shown in said view. When in this position, the top corner of the member 214 will engage the upper flight of the belt 60 and clutch the belt between such corner and the abutment 205, thus locking the carriage to the said flight of the belt. Assuming that the extruding machine E is in operation and is delivering the material P to the receiving apparatus, said material will run off the delivery end of the conveyor 105 and onto the tray 77, as indicated in broken lines in Fig. 3, accumulating thereon as the carriage continues to move with the upper flight of the carriage propelling belt. The operator, standing in front of the apparatus, shoves the free end of the conveyor 105 toward the rear side of the carriage so as to lay the material along the tray adjacent the rear edge thereof. The travel of the carriage in the present direction is arrested when the trip element 230 strikes the appropriate stop 240 and swings said element to the left, as viewed in Fig. 16. When actuated, one of the shoulders 232 of said element strikes a corner of the hub 225 of the weighted arm 226 and swings said arm over center so that the weight 227 will strike the lug 222 of the beam 220 and rock said beam to the position shown in Fig. 16, whereupon the position of the clutch members 212 and 214 will be reversed thereby to release the reversing mechanism from the upper flight of the belt 60 and couple it to the lower flight in a manner obvious from the foregoing description. This will reverse the direction of travel of the carriage and cause the material P to be folded back and laid upon the tray in substantially parallel relation to the portion previously deposited, the attendant drawing the free end of the conveyor 105 gradually toward him as the operation proceeds in order to properly distribute the material upon the tray. If, due to momentum, the carriage continues to move after the reversing mechanism has been tripped, it will be arrested by engagement of a hook 233 of the trip element with the stop.

While I have shown but one embodiment of my invention, it will be obvious to those skilled in the art that the invention is not so limited, but is susceptible to various changes and modifications without departing from the spirit thereof, and I desire, therefore, that only such limitations shall be placed thereupon as are specifically set forth in the appended claims.

Having thus described my invention, what I claim is:

1. Receiving apparatus for use with machines producing continuous linear material, said apparatus comprising an elongated frame, a carriage reciprocable therealong, a receptacle for the material supported by the carriage, an endless flexible propelling element for the carriage, means supporting said element to provide two flights that extend substantially in the direction of movement of the carriage, means for driving said element continually in one direction, reversing mechanism acting to alternately couple the carriage to the opposite flights of said element, and a conveyor supported by the frame with its discharge end over the carriage about midway of the length of travel of the latter.

2. Receiving apparatus for use with machines producing continuous linear material, said apparatus comprising an elongated frame, a carriage reciprocable therealong, a receptacle for the material supported by the carriage, an endless flexible element for propelling the carriage to and fro, means supporting said element in such manner as to provide opposed flights that are substantially parallel to the direction of movement of the carriage, a clutch device on the carriage by means of which driving connections are alternately established between the carriage and the opposed flights of said element, trip means for actuating the clutch device to cause it to release one and clutch the other of said flights, stops carried by the frame and adjustable therealong for engagement by said trip means, and a conveyor supported by the frame with its discharge end over the carriage about midway of the length of the travel of the latter.

3. Apparatus according to claim 2, wherein said trip means incorporates holding parts that cooperate with said stops to positively arrest movement of the carriage.

4. Receiving apparatus for use with machines producing continuous linear material, said apparatus comprising an elongated frame, a carriage reciprocable therealong, a receptacle for the material supported by the carriage, shafts supported by and transversely of the frame adjacent the ends of the range of movement of the carriage, pulleys carried by said shafts, an endless belt engaged about said pulleys with its upper and lower flights in a substantially vertical plane, a structure secured to and depending from the carriage adjacent the belt, clutch means sustained by said structure for alternately establishing driving connections with the upper and lower flights of the belt, trip means carried by said structure for actuating the clutch means, and stops supported by and adjustable along the frame for engagement by said trip means.

5. Receiving apparatus for continuous linear material comprising an elongated frame, a carriage capable of movement therealong, a receptacle for the material supported by the carriage, means for propelling the carriage to and fro, separable connections between the carriage and said means, a conveyor supported by the carriage alongside said receptacle, a driving element for said conveyor, separable driving connections between said element and the carriage propelling means whereby the conveyor is operated by said means, and a second conveyor for receiving the material and feeding it to the first mentioned conveyor, the second conveyor being movably connected to the frame and having a part adjacent its discharge end for interengagement with a part of the first mentioned conveyor.

6. Receiving apparatus for continuous linear material comprising an elongated frame, a carriage reciprocable along said frame, a receptacle for the material supported by the carriage, an endless carriage propelling belt, pulleys rotatably supported within the frame of the machine and over which said belt is engaged thereby to position its opposite flights in a substantially vertical plane below the carriage, separable driving connection between the carriage and said belt, a conveyor supported by the carriage along the rear side of the receptacle, a second conveyor movably connected to the frame of the machine adjacent its receiving end so that the discharge end thereof may be positioned to deliver the material to the second conveyor, parts on the two conveyors cooperating to maintain the second conveyor in operative relation to the first mentioned conveyor, the second conveyor coacting with the other conveyor to restrain the carriage against movement in one direction, an element driven by the carriage propelling belt, and separable driving connections between said element and the first mentioned conveyor which serves to restrain the carriage from movement in the opposite direction.

7. Apparatus comprising the combination and arrangement of parts defined by claim 6, plus: means supported by the frame for raising and lowering the second conveyor and for sustaining it with its discharge end elevated and capable of being shifted transversely of the carriage.

8. In apparatus of the character described, the combination of an elongated frame, a track incorporated therein and extending lengthwise of the frame adjacent the top thereof, a carriage reciprocable along the track, shafts supported by and transversely of the frame near the ends of the track, pulleys on said shafts, an endless flexible carriage propelling element engaged about said pulleys, means for driving one of said shafts constantly in one direction, clutch mechanism fastened to and depending from the carriage for holding engagement, alternately, with the opposed flights of said propelling element, trip means for shifting the clutch mechanism from holding engagement with one to the other of said flights, an elongated stop support sustained by the frame and extending longitudinally thereof, stops adapted to be secured to said support in different positions of adjustment for engagement by a part of said trip means, a belt conveyor and body structure therefor, an end of said body structure being attached to an end of the frame, means for sustaining said body structure so that the delivery end of the conveyor is supported above the carriage about midway of the range of travel of the latter, and a tray supported by the carriage.

9. In apparatus of the character described, the combination of an elongated frame, a track incorporated therein and extending lengthwise of the frame adjacent the top thereof, a carriage reciprocable along the track, shafts supported by and transversely of the frame near the ends of the track, pulleys on said shafts, an endless flexible carriage propelling element engaged about said pulleys, means for driving one of said shafts constantly in one direction, clutch mechanism fastened to and depending from the carriage for holding engagement, alternately, with the opposed flights of said propelling element, trip means for shifting the clutch mechanism from holding engagement with one to the other of said flights, an elongated stop support sustained by the frame and extending longitudinally thereof, stops adapted to be secured to said support in different positions of adjustment for engagement by a part of said trip means, said part being shaped to assume positive holding engagement with a stop in the event of overtravel of the carriage, a belt conveyor and body structure therefor, an end of said body structure being attached to an end of the frame, means for sustaining said body structure so that the delivery end of the conveyor is supported above the carriage about midway of the range of travel of the latter, and a tray supported by the carriage.

10. In apparatus of the character described, the combination of an elongated frame, a track incorporated therein and extending lengthwise of the frame adjacent the top thereof, a carriage reciprocable along the track, shafts supported by and transversely of the frame near the ends of the track, pulleys on said shafts, an endless flexible carriage propelling element engaged about said pulleys, means for driving one of said shafts constantly in one direction, clutch mechanism fastened to and depending from the carriage for holding engagement, alternately, with the opposed flights of said propelling element, trip means for shifting the clutch mechanism from holding engagement with one to the other of said flights, an elongated stop support sustained by the frame and extending longitudinally thereof, stops adapted to be secured to said support in different positions of adjustment therealong for engagement by a part of said trip means, a belt conveyor and body structure therefor, said body structure being supported by the frame so that the delivery end of the conveyor is above the carriage and about midway of the range of travel of the latter, a tray, and means incorporated in the carriage for supporting said tray in a downwardly and forwardly inclined position.

11. In apparatus of the character described, the the combination of an elongated frame, a track incorporated therein and extending lengthwise of the frame adjacent the top thereof, a carriage reciprocable along the track, shafts supported by and transversely of the frame near the ends of the track, pulleys on said shafts, an endless flexible carriage propelling element engaged about said pulleys, means for driving one of said shafts constantly in one direction, clutch mechanism fastened to and depending from the carriage for holding engagement, alternately, with the opposed flights of said propelling element, trip means for shifting the clutch mechanism from holding engagement with one to the other of said flights, an elongated stop support sustained by the frame and extending longitudinally thereof, stops adapted to be secured to said support in different positions of adjustment therealong for engagement by a part of said trip means, a belt conveyor and body structure therefor, means for driving the belt conveyor, means attaching said body structure to one end of the frame for lateral and vertical swinging movement, means carried by the frame for swinging said body structure in a vertical direction and for sustaining its distal end in elevated position above the carriage for movement laterally of the same, and a receptacle on the carriage for receiving material as it is discharged from said conveyor.

12. In apparatus of the character described, the combination of an elongated frame, a track incorporated therein and extending lengthwise of the frame adjacent the top thereof, a carriage reciprocable along the track, shafts supported by and transversely of the frame near the ends of the track, pulleys on said shafts, an endless flexible carriage propelling element engaged about said pulleys, means for driving one of said shafts constantly in one direction, clutch mechanism fastened to and depending from the carriage for holding engagement, alternately, with the opposed flights of said propelling element, trip means for shifting the clutch mechanism from holding engagement with one to the other of said flights, stops adjustably supported by the frame for engagement by a part of said trip means, a belt conveyor and body structure therefor, means for driving the belt conveyor, a unit pivotally connected at one of its ends to an end of the frame, the opposite end of said unit being adjustable in a vertical direction, means for retaining said unit in any position of adjustment with respect to the frame, one end of said body structure having connection with said other end of the unit and which connection is of such nature that said body structure is capable of swinging in vertical and transverse directions, means carried by the frame for elevating the distal end of said body structure and supporting it in various positions of vertical adjustment and so that it is capable of lateral movement, and a receptacle supported by the carriage for receiving the material discharged from said conveyor.

13. In apparatus of the character described, the combination of an elongated frame, a track incorporated therein and extending lengthwise of the frame adjacent the top thereof, a carriage reciprocable along the track, shafts supported by and transversely of the frame near the ends of the track, pulleys on said shafts, an endless flexible carriage propelling element engaged about said pulleys, an electric motor supported by the frame, transmission mechanism including change-of-speed means also supported by the frame, driving connections between the motor and said transmission mechanism, further driving connections between said mechanism and one of the aforesaid shafts, clutch mechanism fastened to and depending from the carriage for holding engagement, alternately, with the opposed flights of the aforesaid propelling element, trip means for shifting the clutch mechanism from holding engagement with one to the other of said flights, stops supported by and adjustable longitudinally of the frame, means for locking said stops in different positions of adjustment, said stops being arranged for engagement by a part of said trip means, a belt conveyor and body structure therefor, said body structure being attached to the frame adjacent one end thereof and so that the delivery end of the conveyor belt is spaced above the carriage about midway of the range of travel of the latter, driving connections between said transmission mechanism and said conveyor belt, and a tray on the carriage to receive material discharged from the conveyor belt.

14. In apparatus of the character described, the combination of an elongated frame, a track incorporated therein and extending lengthwise of the frame adjacent the top thereof, a carriage reciprocable along the track, shafts supported by and transversely of the frame near the ends of the track, pulleys on said shafts, an endless flexible carriage propelling element engaged about said pulleys, means for driving one of said shafts, separable operative connections between the carriage and said propelling element, a belt conveyor and body structure therefor, means for driving the belt conveyor, one end of said body structure having connection with the frame, a second belt conveyor and body structure therefor, the latter being incorporated in the carriage, separable driving connections between the other of the aforesaid shafts and the second belt conveyor, means for holding the adjacent ends of the body structures together so that material will pass from the first to the second mentioned belt conveyors, and a receptacle for said material supported by the carriage.

15. In apparatus of the character described, the combination of an elongated frame, a track incorporated therein and extending lengthwise of the frame adjacent the top thereof, a carriage reciprocable along the track, shafts supported by and transversely of the frame near the ends of the track, pulleys on said shafts, an endless flexible carriage propelling element engaged about said pulleys, an electric motor supported by the frame, driving connections between the motor and one of the aforesaid shafts, clutch mechanism fastened to and depending from the carriage for holding engagement, alternately, with the opposed flights of the aforesaid propelling element, trip means for shifting the clutch mechanism from holding engagement with one to the other of said flights, stops supported by and adjustable longitudinally of the frame, means for locking said stops in different positions of adjustment, said stops being arranged for engagement by a part of said trip means, a belt conveyor and body structure therefor, said body structure being attached to the frame adjacent one end thereof in such manner that the delivery end of the conveyor is capable of being spaced above the carriage about midway of the range of travel of the latter, driving connections between the aforesaid motor and said belt conveyor, another belt conveyor and body structure therefore incorporated in the carriage, the distal end of the body structure of the first mentioned conveyor being adapted for holding engagement with the adjacent end of the body structure of the second mentioned conveyor so that material will be delivered from the first mentioned to the second mentioned belt conveyor, separable driving connections between the distal end of the latter belt conveyor and the nearest of the aforesaid shafts, and a receptacle for said material supported by the carriage forwardly of the second mentioned belt conveyor.

16. In apparatus of the character described, the combination of an elongated frame, a track incorporated therein and extending lengthwise of the frame, a carriage reciprocable along the track, shafts supported by and transversely of the frame near the ends of the track, pulleys on said shafts, an endless flexible carriage propelling element engaged about said pulleys, an electric motor supported by the frame, driving connections between the motor and one of the aforesaid shafts, a friction clutch providing driving connections between the last mentioned shaft and the pulley thereon, clutch mechanism fastened to and depending from the carriage for holding engagement, alternately, with the opposed flights of the aforesaid propelling element, trip means for shifting the clutch mechanism from holding engagement with one to holding engagement with the other of said flights, stops supported by and adjustable longitudinally of the frame, means for locking said stops in different positions of adjustment, said stops being arranged for engagement by a part of said trip means, a belt conveyor and body structure therefor, said body structure being attached to the frame adjacent one end thereof so that the delivery end of the belt conveyor is capable of being above the carriage about midway of the range of travel of the latter, driving connections between the motor and said conveyor, and a receptacle supported by the carriage in a position to receive material from said belt conveyor.

17. Receiving apparatus for use with machines producing relatively narrow continuous linear material capable of being folded laterally back and forth upon itself, said apparatus comprising an elongated frame, a carriage reciprocable along the frame, a receptacle for the material supported by the carriage, means for propelling the carriage to and fro, a conveyor structure disposed with its discharge end over the carriage about midway of the length of travel of the latter, and means movably supporting the conveyor structure so that its discharge end is capable of movement transversely of the direction of movement of said receptacle.

18. Receiving apparatus for use with machines producing relatively narrow continuous linear material capable of being folded laterally back and forth upon itself, said apparatus comprising an elongated frame, a carriage reciprocable along the frame, a receptacle for the material supported by the carriage, means for propelling the carriage to and fro, and a conveyor structure disposed with its discharge end over the carriage about midway of the length of travel of the latter, the discharge end of said conveyor structure and the receptacle being relatively movable in a direction transversely of the direction of travel of the carriage.

References Cited in the file of this patent

UNITED STATES PATENTS

| Number | Name | Date |
|---|---|---|
| 1,270,334 | Schumacher et al. | June 25, 1918 |
| 1,353,613 | Renton | Sept. 21, 1920 |
| 1,543,219 | Mason | June 23, 1925 |
| 1,710,978 | Herbener | Apr. 30, 1929 |
| 1,771,869 | Baldenhofer | July 29, 1930 |
| 1,991,379 | Coyne et al. | Feb. 19, 1935 |
| 2,280,854 | Rooney | Apr. 28, 1942 |
| 2,306,431 | Exley | Dec. 29, 1942 |
| 2,470,795 | Socke | May 24, 1949 |
| 2,506,684 | Saboe | May 9, 1950 |
| 2,517,546 | Deakin | Aug. 8, 1950 |
| 2,520,131 | Deakin | Aug. 29, 1950 |

FOREIGN PATENTS

| Number | Country | Date |
|---|---|---|
| 520,290 | Great Britain | Apr. 19, 1940 |